United States Patent [19]

Kuzma

[11] Patent Number: 5,130,897
[45] Date of Patent: Jul. 14, 1992

[54] LIGHT GUIDE FOR A TELEPHONE DIAL

[75] Inventor: Vineeta Kuzma, Carmel, Ind.

[73] Assignee: AT&T Bell Laboratories, Murray Hill, N.J.

[21] Appl. No.: 785,965

[22] Filed: Oct. 31, 1991

[51] Int. Cl.$^5$ ............................................. H04M 1/22
[52] U.S. Cl. ................................. 362/24; 362/27; 362/31; 362/88; 362/330; 362/800; 40/337; 40/546
[58] Field of Search ............... 362/23, 26, 24, 27, 362/29, 30, 32, 86, 88, 89, 255, 326, 330, 331, 335, 800; 40/337, 546

[56] References Cited

U.S. PATENT DOCUMENTS

| | | | |
|---|---|---|---|
| 2,858,417 | 10/1958 | Stevens et al. | 362/31 |
| 3,774,021 | 11/1973 | Johnson | 240/2.1 |
| 4,323,951 | 4/1982 | Pasco | 362/31 |
| 4,349,705 | 9/1982 | Kuhfus | 179/90 |
| 4,438,300 | 3/1984 | Morse | 179/184 |
| 4,449,024 | 5/1984 | Stracener | 362/31 |
| 4,636,593 | 1/1987 | Novak et al. | 200/5 A |
| 4,776,120 | 10/1988 | Utoh et al. | 40/546 |
| 5,083,240 | 1/1992 | Pasco | 362/31 |

Primary Examiner—Ira S. Lazarus
Assistant Examiner—Sue Hagarman
Attorney, Agent, or Firm—Michael A. Morra

[57] ABSTRACT

An improved light guide for use in illuminating a telephone dial includes apertures through which individual buttons of a telephone dial extend. These buttons are used for dialing and are illuminated by one or more light sources that are positioned within recesses in the light guide. Each recess comprises four inwardly curved walls for directing light from the light source along two paths that are substantially perpendicular to each other. Additional openings within the light guide are designed to reflect light into areas of the dial needing more illumination, and the sides of the light guide are shaped to reflect additional light into those areas. The present invention directs light so efficiently that only two sources are needed to provide uniform illumination in standard telephone dials.

16 Claims, 4 Drawing Sheets

LIGHT GUIDE FOR A TELEPHONE DIAL

TECHNICAL FIELD

This invention relates to the illumination of a telephone dial, and more particularly to a light guide used therein.

Background of the Invention

Among telephone manufacturers, there is a strong desire to improve the quality of their product while keeping cost at competitive levels. An area where there is a long-felt need to improve quality, is the illumination of a telephone dial. Although it is recognized that perfectly uniform illumination is desirable, such perfection is too expensive to implement and is functionally unnecessary. Further, small departures from perfect uniformity are not even noticeable. Nevertheless, uniformity of illumination is perceived by a customer and used in forming an assessment of product quality.

There are a variety of techniques used for illuminating telephone dials that facilitate dialing under low light or darkened conditions. When a telephone set is in its on-hook (inactive) state, electrical power is not available from the telephone line and, hence, cannot be used to illuminate the telephone dial. Accordingly, one popular method for illuminating dials is to distribute commercial power, after a special transformer is used to step down its voltage, over an additional wire-pair which is frequently available with standard telephone wiring. However, such additional wires are not available in many homes and the special transformer is both inconvenient and costly. Further, a lighted dial is of limited utility when the customer is not dialing. Another technique for illuminating a telephone dial is the use of phosphorescent material which is adapted to be visible under low light conditions. U.S. Pat. No. 4,438,300 teaches the use of such material in a telephone dial. However, for the phosphorescent material to glow, it must be properly energized beforehand (ambient light, ultra-violet radiation, and sometimes radio frequency radiation). Even then, such material only glows for a limited time. For these and other reasons, phosphorescent material has not gained wide acceptance for illuminating telephone dials.

U.S. Pat. No. 4,349,705 discloses a push-button dial assembly comprising a plurality of layers. One of the layers is a planar plate made from a transparent plastic material. The plate includes four cylindrical recesses, each receiving a light-emitting diode (LED). The LEDs are energized when the telephone set is in its off-hook (active) state, and light travels through the light guide plate to translucent pushbuttons located on the key pad of the telephone set. Although this technique provides generally good results, it is desirable to reduce the number of light sources while maintaining and/or improving uniformity of illumination.

SUMMARY OF THE INVENTION

As improved light guide includes apertures through which individual buttons of a telephone dial extend. These buttons are used for dialing and are illuminated by one or more light sources that are positioned within one or more recesses in the light guide. Each recess comprises a plurality of inwardly curved walls for directing light from the light source along two paths that are substantially perpendicular to each other.

In an illustrative embodiment of the invention, additional recesses within the light guide are designed to reflect light into areas of the dial needing more illumination, and the sides of the light guide are shaped to reflect additional light into those areas. The present invention directs light so efficiently that only two light sources are needed to provide uniform illumination in standard telephone dials.

DETAILED DESCRIPTION

Lighted telephone dials typically use either two or four light sources, mounted within a telephone set, to provide sufficient illumination for a telephone user to both select and operate the correct push button (key) during dialing. Because telephone sets receive their operating power from a telephone office, which may be some distance away from the set, the available power is somewhat limited. Further, this limited power cannot be used exclusively by the light sources, but must be shared with electrical circuits used for communication. Indeed, although dial illumination is a useful feature, it is only of secondary importance.

Originally, dials were illuminated using incandescent lights which use so much current that locally supplied, commercial (115 volts) power was required. Since then, light emitting diodes (LEDs) have been developed that use less current, and have made it possible to illuminate the telephone dial with only a portion of the power available from the telephone line. Nevertheless, it remains desirable to maximize the illumination of a telephone dial and to improve the uniformity of illumination with a minimum of power.

PRIOR ART

Figure 6:
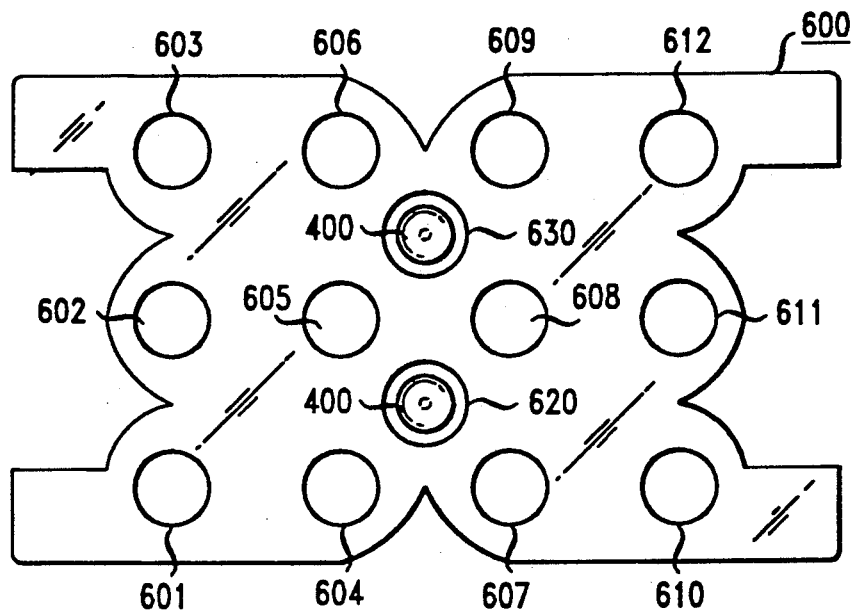
FIG. 6 discloses a prior art light guide.

FIG. 6 discloses a prior art light guide 600 having twelve holes 601–612 that extend completely through the light guide. Pushbuttons (not shown) are inserted into each of the holes and are illuminated by light emitted from a pair of LEDs 400 that are positioned within centrally located recesses 620, 630. This particular light guide is discussed in greater detail in U.S. Pat. No. 3,774,021. Light guide 600 is made from a transparent plastic material which conveys light form LEDs 400 to the holes 601–612, and hence to the pushbuttons located therein. However, some of the pushbuttons will receive more light than others because of their proximity to the LEDs. For example, the push button hole 608 will be brighter than the push button in hole 610; this is because light intensity decreases as the square of the distance from the light source. Such variations are undesirable because overall product quality is frequently judged by apparent imperfections. To minimize these variations, the edges of the light guide 600 are contoured to reflect light toward those push button (e.g., 601, 603, 610, 612) that are relatively distant from the light sources.

If the contours are properly shaped, light rays will be internally reflected. Indeed, if a light ray traveling through a material is incident upon a boundary with a less dense material (lower refractive index), it undergoes total internal reflection when the angle of incidence is greater than a critical angle α which is defined by:

$$\alpha j = \sin^{-1}(n'/n)$$

where n' = refractive index of less dense material; and
n = refractive index of more dense material In the case where the less dense material is air, n' = 1. A suitable material for light guide 600 is methacrylate—an acrylic material having a refractive index of 1.49. In this situation the critical angle α = 42 degrees.

FIG. 6 illustrates another prior art problem associated with light distribution that relates to button size. In order to illuminate the buttons that are farthest from the LEDs 400, it is necessary that there be plenty of space between the buttons so that they do not block the path of the light rays. Because telephone dials tend to be somewhat small, the buttons are also constrained to be small—which limits design freedom based on ergonomic, aesthetic, and utilitarian considerations.

Figure 7:
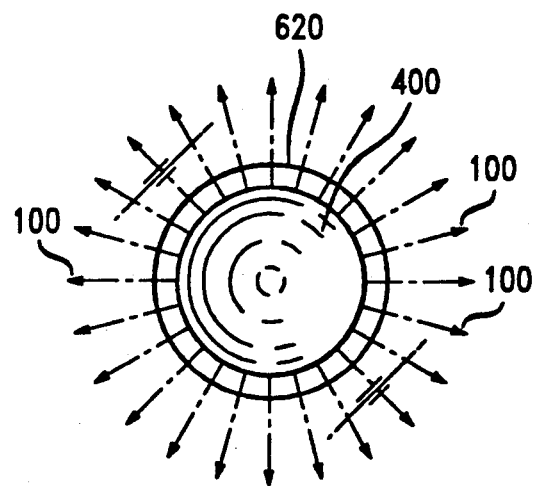
FIG. 7 shows a light ray pattern, produced by the prior art light guide of FIG. 6.

One of the circular recesses 620 is shown in FIG. 7 to illustrate a light ray pattern produced by prior art light guides. Such light guides yield an omnidirectional pattern which, when used in a telephone dial, provide substantially greater illuminates to those buttons closest to LED 400. As will be discussed later in connection with FIG. 4, LED 400 is designed to effectively confine light rays 100 to single plane which is aligned with the plane of the light guide.

AN IMPROVED LIGHT GUIDE

Figure 1:
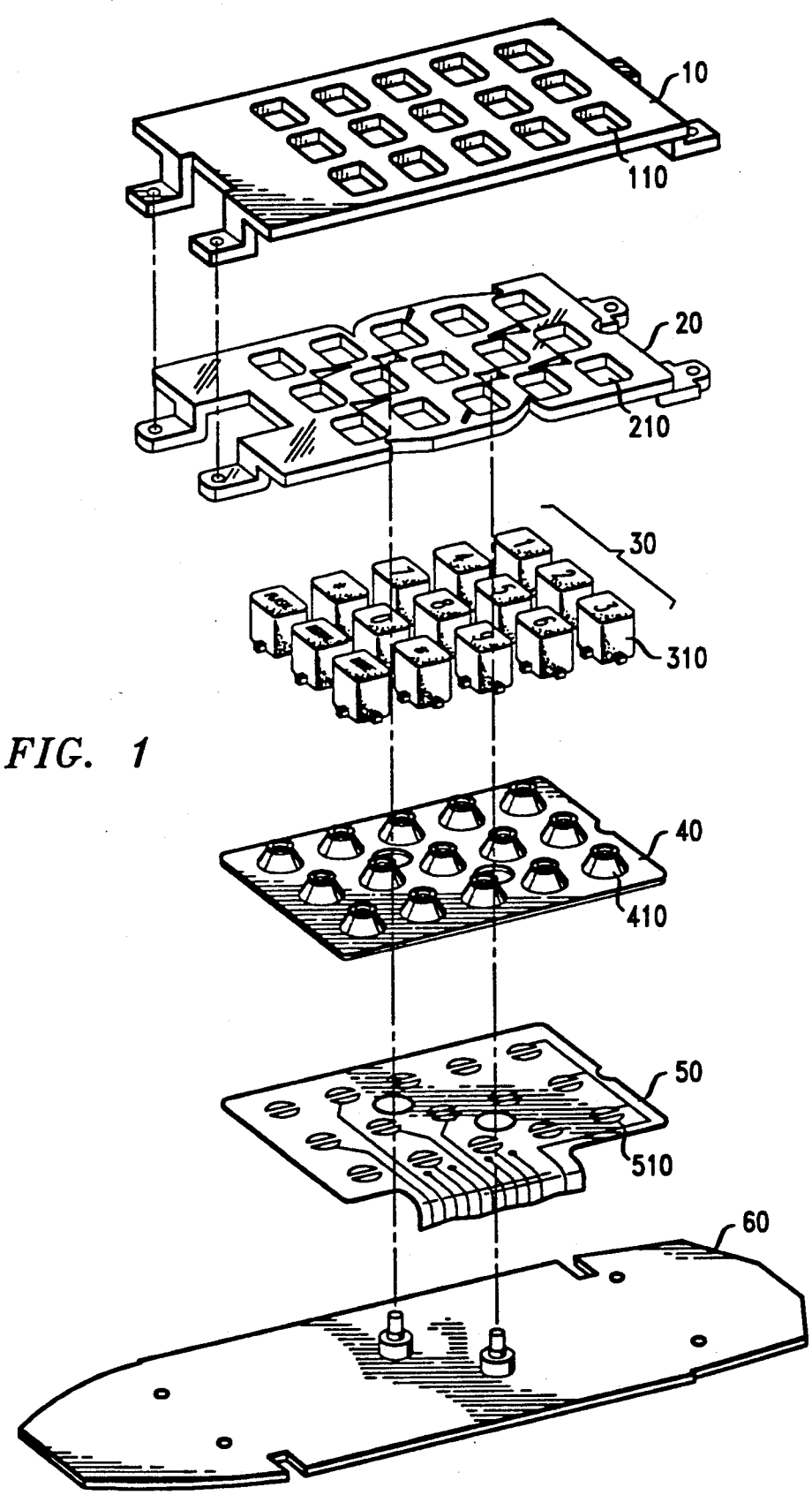
FIG. 1 is an exploded perspective view of a telephone dial assembly in accordance with the invention.

Referring now to FIG. 1, there is disclosed an exploded perspective view of a dial assembly for a telephone set comprising: dial frame 10, light guide 20, buttons 30, membrane switch 40, flexible wiring trace 50 and circuit board 60. These various items cooperate to provide a telephone dial that provides uniform button illumination. Each of the items is discussed in greater detail to illustrate their advantageous interrelationship.

Light for the dial assembly is provided by a pair of LEDs 400 that are located on circuit board 60. Although other components, useful during telephone usage are located on this board, only the LEDs are shown. Note that layers 20, 40 and 50 each include a pair of openings through which these LEDs are inserted. Circuit board 60 is made from rigid FR-4 material and supports the vertically mounted LEDs.

Button array 30 is used for dialing and comprises a plurality of rigid, plastic button 310 which are illuminated when light rays from the LEDs impinge upon them. Within each button, light is dispersed in order to provide a "milky" glow which illuminates numbers and letters formed on its surface. A suitable material for these buttons is poly methyl methacrylate (PMMA) which is commercially available from the Rohm and Haas Co. as their VO52-type Plexiglas ® molding compound.

Membrane switch 40 comprises a plurality of dome-shaped structures 410, each having a generally hemispheric shape, which provide tactile feedback to the user when pressed downward, and which cause an electrical short between wiring paths in corresponding region 510 on flexible wiring trace 50 which is positioned under the membrane switch 40. Shorting a particular set of wiring paths provides an indication as to which button is pressed. In the preferred embodiment of the invention, membrane switch 40 is made from an opaque silicone rubber, and the inside portion of each dome-shaped structure 510 includes a carbon-impregnated area that is electrically conductive. Alternatively, membrane switch 40 and buttons 30 could have been combined into a single structure similar to the one shown in U.S. Pat. No. 4,349,705 which discloses a corresponding pushbutton member made from a translucent polycarbonate material.

Light guide 20 will be discussed in greater detail hereinafter; however, it is sufficient to say that it is a particularly efficient and inexpensive way to guide light from the LEDs 400, located on circuit board 60, to the buttons which are inserted into apertures 210 in the light guide. So that only the illuminated buttons are visible to the user, an opaque bezel (dial cover 10) is positioned on top of light guide 20. Dial cover 10 is made from a rigid plastic material and cooperates with circuit board 60 to "sandwich" the other items shown in FIG. 1 therebetween. Apertures 110 in the dial cover allow the buttons 310 to protrude for easy access by the user. The buttons are uniformly illuminated using only two LEDs 400, and provide the assembled telephone dial with a quality appearance.

Figure 2:
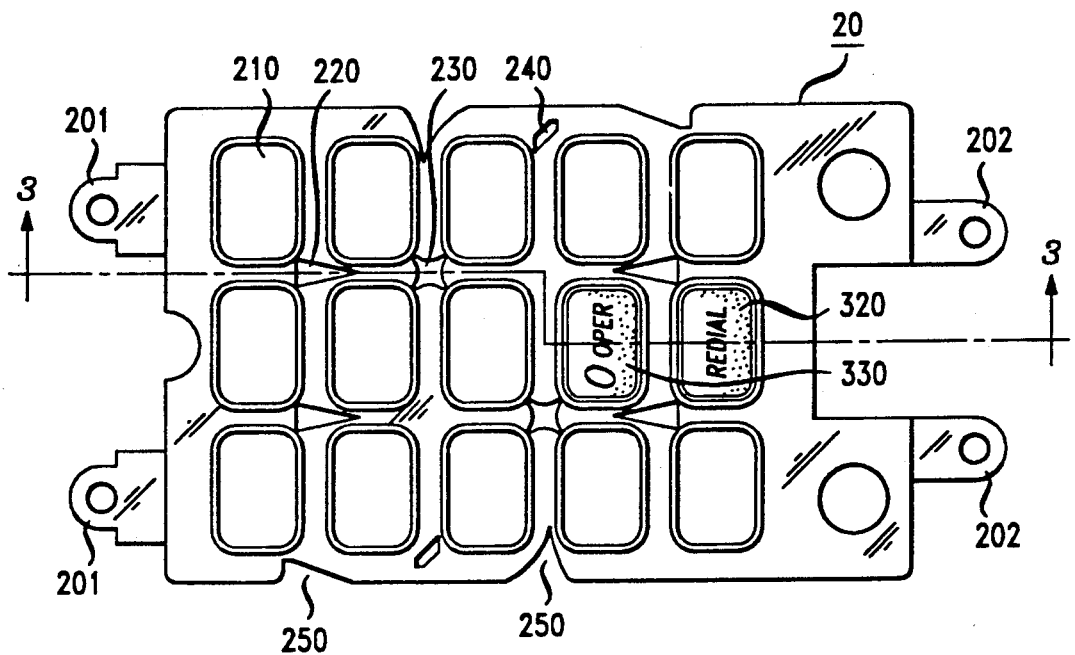
FIG. 2 discloses a light guide in accordance with the invention.

A top view of the light guide is shown in FIG. 2 showing its structure in greater detail. Light guide 20 includes a plurality of apertures 210 that extend completely through the light guide which has a thickness of approximately 2.5 millimeters and is made from a translucent plastic material. In the preferred embodiment of the invention, a clear, optical clarity material such as methacrylate may be used. A suitable material is commercially available from the Rohm and Haas Co. as their Plexiglas ® VS-100. Light guide 20 includes a pair of recesses 230 which, in the preferred embodiment of the invention, extend completely through the light guide. Light sources (e.g., LEDs) are inserted into these recesses for the purpose of illuminating the buttons inserted into apertures 210. In contrast with the prior art, each recess comprises four convex lense that direct light in the vertical and horizontal directions. Each recess includes four inwardly curving wall for directing light along two perpendicular directions which provides substantially improved light distribution. This improvement is particularly important when the buttons are close together and would otherwise restrict the amount of light that reaches the buttons that are most distant from the LEDs. It is noted that the apertures 210 are arranged to accommodate buttons that are arrayed into vertical columns and horizontal rows. Advantageously, recesses 230 are positioned between the columns and rows so that light can be easily routed in the vertical and horizontal directions between the buttons. Such positioning is instrumental in allowing button size to be increased while still providing improved illumination for those buttons that ar farthest from the LEDs. This, in turn, provides greater design freedom in selecting button styles based on various considerations. Light distribution is further improved by holes 220, 240 and by shaped edges 250 that reflect light toward predetermined regions in need of more illumination. It is noted that for the methacrylate material used, light rays that reach the methacrylate/air boundary are totally reflected back into the methacrylate when the angle of incidence is greater than approximately 42 degrees. Although each recess is designed to receive an LED having a diameter of 3 millimeters, it is clear that larger/smaller recesses and LEDs would receive similar benefit, and that the particular number of recesses used is immaterial. Specific buttons 320, 330 are shown protruding through openings in the light guide and tabs 201, 202 are used for fastening the light guide 20 to the associated telephone set.

Figure 3:
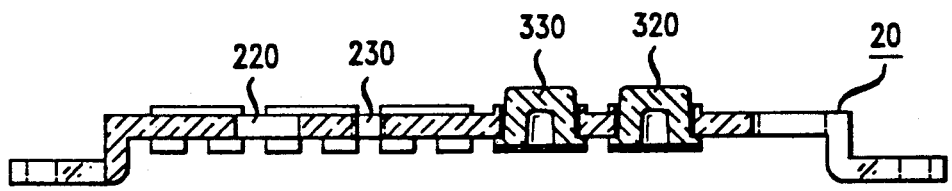
FIG. 3 is a cross sectional view of the light guide of FIG. 2.

FIG. 3 discloses a cross sectional view of the light guide shown in FIG. 2 in order to better illustrate its construction. Hole 220 and recess 230 are shown extending completely through light guide 20, and buttons 320, 330 are shown positioned in their associated apertures. LED 400, shown in FIG. 4 is to be inserted into recess 230.

Figure 4:
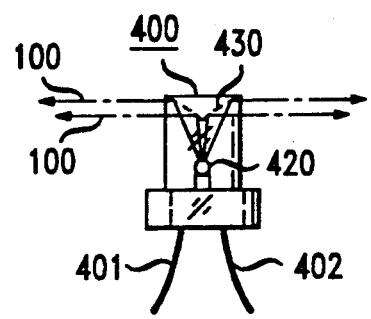
FIG. 4 is a side view of a light emitting diode, suitable for use with the invention.

Referring now to FIG. 4, a side view of LED 400 is disclosed which is useful in practicing the invention. The LED is an electrical component that emits light when a voltage is applied to its input leads 401, 402. An LED only permits current to flow in one direction so that if the polarity of the applied voltage is incorrect, then no current will flow and no light will be emitted. In the preferred embodiment of the invention, LED 400 is designed to emit light primarily in a plane which is perpendicular to the FIG. 4 drawing and which coincides with the direction of light rays 100 shown therein. When LED 400 is positioned within the light guide, the plane of emitted light is aligned with the plane of the light guide in order to couple all of the emitted light toward the buttons inserted into the light guide. To accomplish this, the dome 430 of LED 400 is shaped to reflect light into a single plane. This technique is disclosed in greater detail in U.S. Pat. No. 3,774,021 which illustrates a particularly efficient LED module having a dome whose geometry maximizes the light output in a single plane. One suitable component is commercially available from Kingbright Electronic Co., Ltd as their L-474GC light emitting diode.

Figure 5:
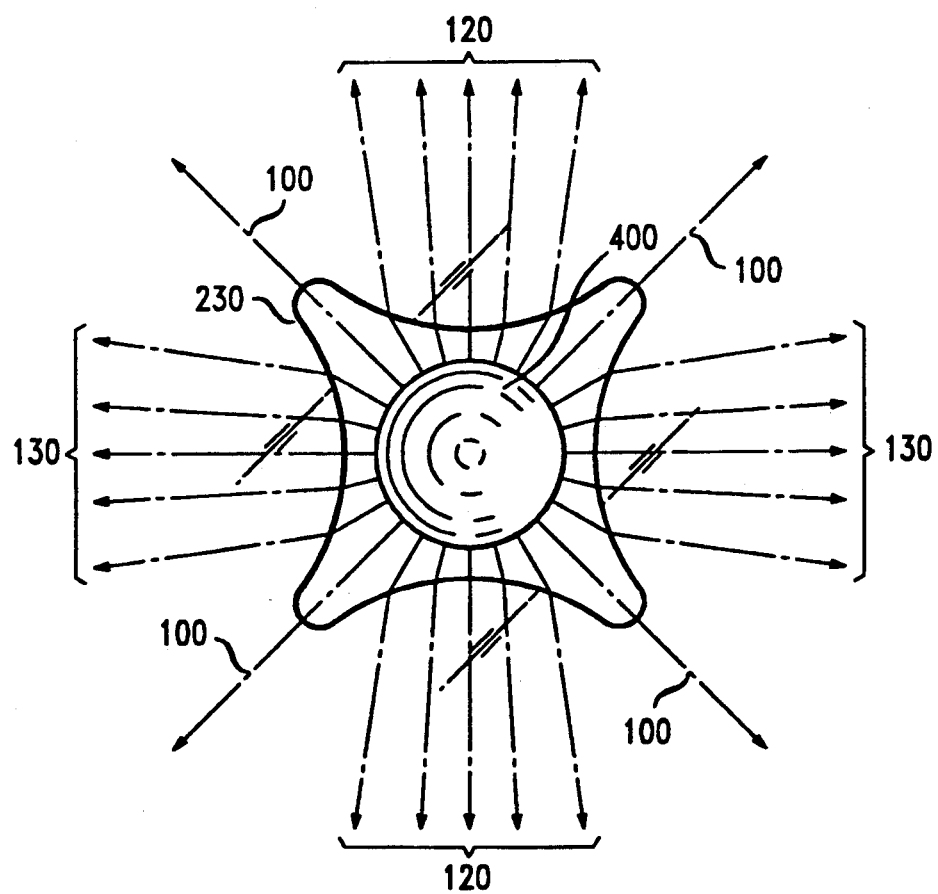
FIG. 5 shows a light ray pattern, produced by the light guide of the present invention.

FIG. 5 discloses a top view of a single recess 230, shaped in accordance with the invention, into which LED 400 is inserted. Light rays 100 are shown emanating radially from the LED without change in their direction. However, recess 230 of the present invention includes sidewalls that surround the light source where at least one of the sidewalls is curved toward the interior of the recess to focus more light in one direction than in another direction. Indeed, recess 230 includes four inwardly curved sidewalls that focus the light rays emanating from the LED along two mutually perpendicular directions. Light rays 130 are shown traveling in the horizontal direction while light rays 120 are shown traveling in the vertical direction. In the region where pairs of sidewalls meet, light rays 100 are not redirected and provide lighting for the buttons that surround the LED. The particular shape of recess 230 in the region between pair so sidewalls is a matter of small significance. The principal benefit comes from concentrating more light into one or more directions than would be there if an omnidirectional radiation pattern existed. This benefit is contrasted with the prior art, shown in FIG. 7, which shows light rays emanating from LED 400 that are neither bent nor redirected into another direction by recess 620.

Although a particular embodiment has been shown and described, it is understood that various modifications are possible within the spirit and scope of the invention. These modifications include, but are not limited to, different amounts of curvature in the sidewalls of the recess, the use of materials other than optical clarity methacrylate for the light guide, and recesses that have a different number of inwardly curved walls for directing light.

I claim:

1. A light guide for use in illuminating buttons of a telephone dial, the light guide comprising a generally planar structure with a plurality of apertures therein for receiving buttons that extend therethrough, the light guide further including at least one recess having an interior region for receiving a light source therein, each recess including sidewalls for surrounding the light source, at least one of the sidewalls being curved toward the interior of the recess for focusing more light in one direction than in another direction.

2. The light guide of claim 1 wherein the number of inwardly curved sidewalls in each recess is four, the sidewalls being positioned to direct light from the light source into two principal directions that are approximately perpendicular to each other.

3. The light guide of claim 1 wherein each recess extends completely through the light guide.

4. The light guide of claim 2 wherein the apertures are positioned in a rectangular array of horizontal rows and vertical columns, each recess being positional at an intersection between the rows and columns of apertures.

5. The light guide of claim 2 wherein the number of recesses is two.

6. The light guide of claim 4 further including a plurality of openings, positioned between the same columns as the recesses, for reflecting light emanating from the light source within each recess toward predetermined apertures.

7. The light guide of claim 6 wherein each opening fully extends between opposite sides of the light guide.

8. The light guide of claim 1 wherein the light guide is made from methacrylate material of optical clarity.

9. A telephone dial assembly comprising:
   a circuit board having one or more light sources mounted thereon;
   a plurality of button members, made from translucent material for use in dialing; and
   a transparent light guide having a plurality of apertures for receiving the button members that extend upwardly through the apertures, said apertures being arranged in any array of columns and rows, the light guide further including one or more recesses for individually receiving a light source, each recess comprising sidewalls for surrounding the light source, at least one of the sidewalls being curved toward the interior of the recess for focusing more light in one direction than in another direction.

10. The dial assembly of claim 9 further including an opaque bezel mounted on the light guide, said bezel including a plurality of apertures for the button members to extend therethrough; whereby only the light from the button members is visible.

11. The dial assembly of claim 10 further including membrane switching means, made from a flexible rubber material and comprising a plurality of generally hemispheric domes, equal in number to the number of button members, each dome being positioned beneath one of the button members and including conductive material on one side thereof for completing an electrical path during dialing.

12. The dial assembly of claim 9 wherein the guide has a generally planar appearance and further includes a plurality of shaped openings that extend between opposite sides of the light guide for the purpose of reflecting light toward predetermined buttons in the assembly.

13. The dial assembly of claim 12 wherein the light guide further includes edges that are contoured to reflect light toward predetermined buttons in the assembly.

14. The dial assembly of claim 12 wherein the light source comprises a light emitting diode, said diode being adapted to emit light principally in a single plane, said plane being coincident with the light guide.

15. An illuminated faceplate comprising a substantially planar sheet of transparent plastic having a top surface that is opaque except for a number of discrete regions which are illuminated with light from a lesser number of light sources, the faceplate further comprising:
   at least one recess in the thickness of the faceplate; and
   a light source fitted within each recess, said recess comprising four inwardly curved walls for directing light from the light source along two axes that are generally perpendicular to each other.

16. The illuminated faceplate of claim 15 wherein the top surface comprises a bezel, mounted on the transparent plastic.

* * * * *